Aug. 1, 1967 C. DOBELL 3,334,026
PRODUCING FRESH WATER FROM AIR RAISED TO HIGH HUMIDITY
BY EXPOSURE TO WATER VAPOR FROM CONTAMINATED
SOURCES OF WATER
Filed Oct. 25, 1963 3 Sheets-Sheet 3

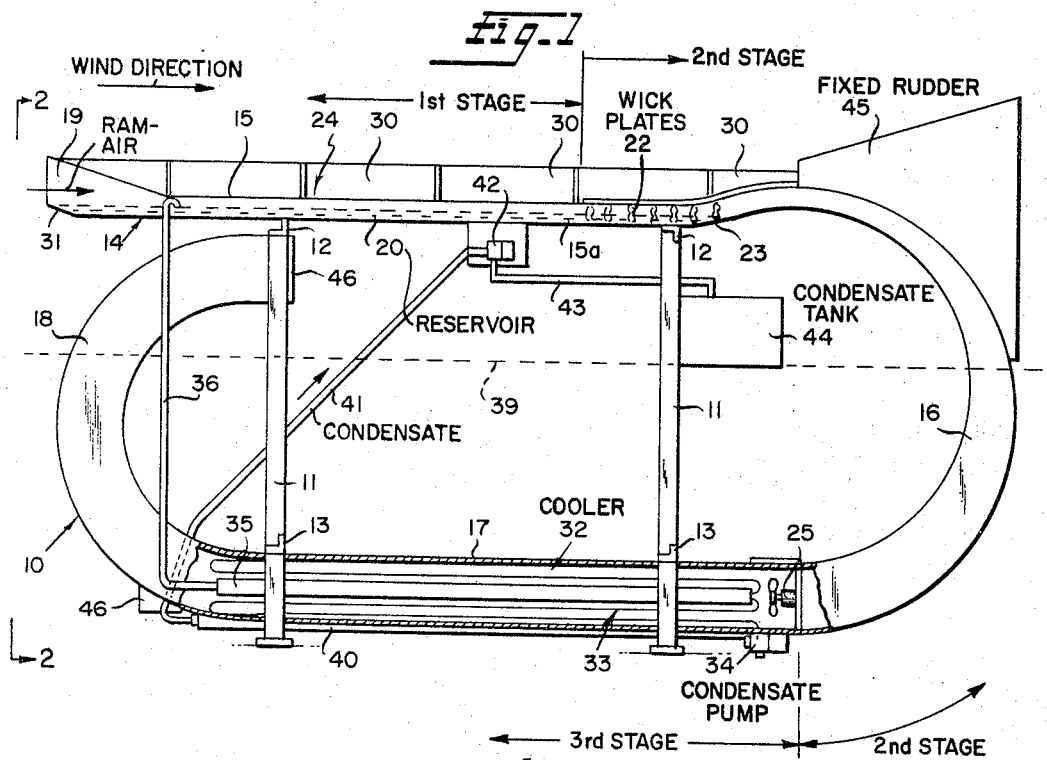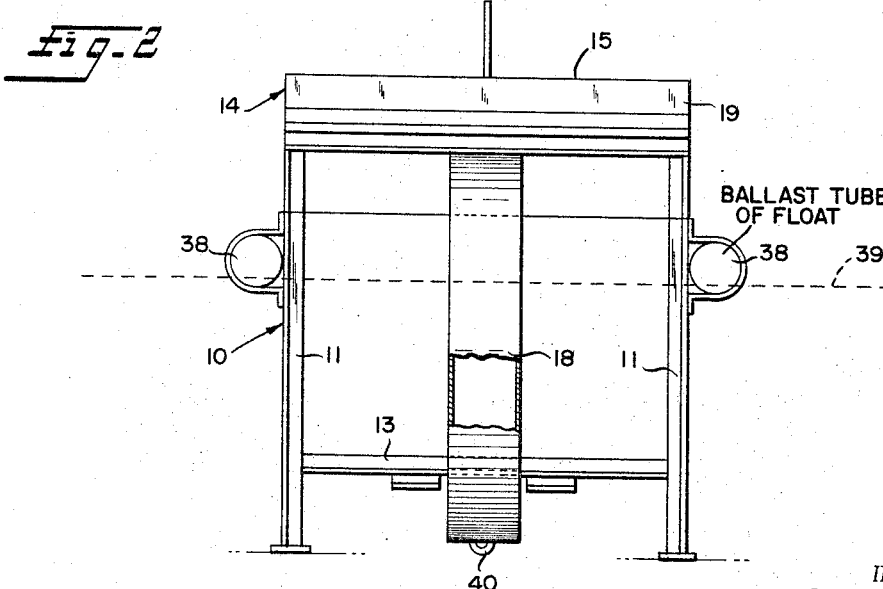

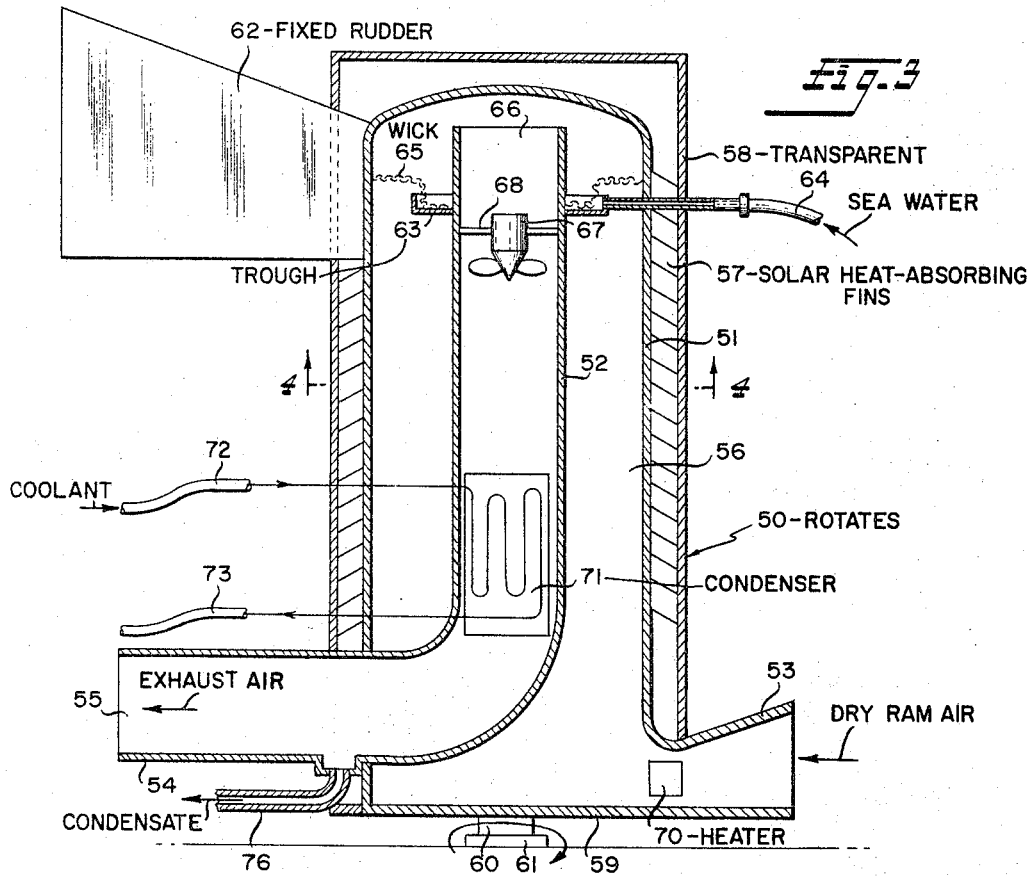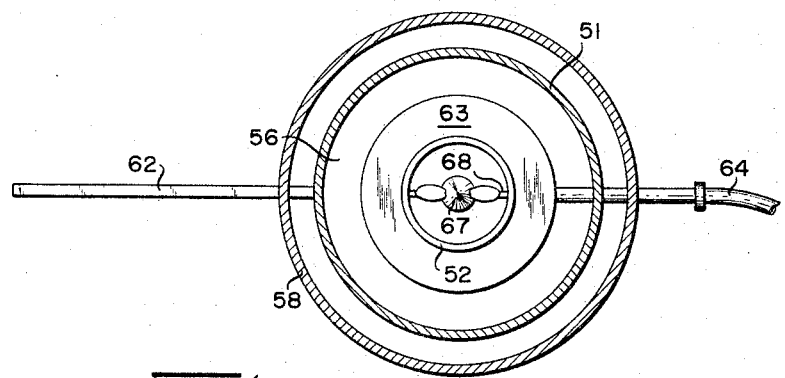

*Fig.5*

INVENTOR
*Curzon Dobell*

BY *Stevens, Davis, Miller & Mosher*
ATTORNEYS

United States Patent Office 3,334,026
Patented Aug. 1, 1967

3,334,026
PRODUCING FRESH WATER FROM AIR RAISED TO HIGH HUMIDITY BY EXPOSURE TO WATER VAPOR FROM CONTAMINATED SOURCES OF WATER
Curzon Dobell, P.O. Box 643, Nassau, Bahamas
Filed Oct. 25, 1963, Ser. No. 319,058
12 Claims. (Cl. 203—10)

The present invention relates to a method and apparatus for the production of potable or fresh water and more particularly to the abstraction of said potable water from humid air in a three stage cycle or apparatus.

It is well known that in certain areas of the world there is a shortage of fresh water, and particularly potable water because of the geographical nature of the area or due to the fact that certain areas although they have had a sufficient water supply up to the present time now require more fresh water because of population and industrial expansion.

Some common methods of abstracting fresh water from sea water or brackish water have been directed toward such abstraction by freezing or electrolysis.

In accordance with the present invention it is an object hereof to produce potable or fresh water in a three stage process by passing a stream of atmospheric air which contains a large quantity of water vapor through a first stage wherein the temperature of the air is increased so that the saturation point of the air increases as a result of which a given volume of air will absorb a greater quantity of water, in the form of vapor and hence it can carry more water vapor therein. After the temperature of the air stream is increased it is exposed to a source of moisture in a second stage which it can absorb like a sponge until it reaches the saturation point. Thereafter, this stream of air is passed to a third stage wherein the air temperature is lowered to cool the saturated air, and to condensate the water vapor in the air and thus produce fresh or potable water.

It is another object of the present invention to provide a method and apparatus for producing fresh water from a flowing body or stream of atmospheric air, in which the fresh water is produced in a three stage process using predetermined differentials in temperature and pressure by passing the stream of air through the first stage and increasing its temperature while decreasing its pressure so as to increase the amount of water vapor that can be absorbed by the stream, passing it through a second stage and increasing the actual water vapor carried in the air stream by exposing it to additional water vapor and thereafter passing it to a third stage wherein the temperature of the air is decreased and the pressure is increased so as to squeeze out and condense the water vapor in the air stream.

It is another object of the present invention to provide an apparatus for producing fresh water comprising three stages in the form of two concentric cylinders vertically disposed to provide a chimney effect to move increased quantities of air containing water vapor therethrough and wherein the air stream moves upwardly in the first and downwardly in the third stage. The first stage is provided with means for increasing the temperature of the air flowing therethrough. The first stage is provided with fin members and the entire surface is painted a dull black to absorb solar heat and the third stage is insulated therefrom and exposed surfaces are painted a shiny white to minimize heat absorption in the third stage. The provision of the means for heating the air in the first stage will cause the incoming air to rise. The second stage is provided with means for increasing the vapor content of the air flowing therethrough. The third stage is provided with cooling means which will cause the air stream to move downwardly or sink thereby creating a normal draft through the three stage apparatus irrespective of the wind velocity.

It is another object of the present invention to provide an apparatus for producing fresh water from a stream of air caused to flow therethrough, such apparatus having concentric vertically disposed cylindrical members forming a first stage, a second stage, and a third stage, and in which the entire apparatus is provided with means for permitting it to rotate on a swivel base whereby the air intake to the first stage is pointed into the wind and the exhaust from the third stage is pointed away from the wind.

It is another object of the present invention to provide an apparatus for the production of fresh water consisting of three separate stages to the form of the concentric cylinders standing vertically to provide a chimney effect to move increasing quantities of air and in which the first stage is provided with auxiliary heater means so as to increase the temperature of air in the first stage when the solar temperature differential falls below a predetermined level, and having auxiliary fan means disposed in the third stage to move the air and increase its pressure therein when the wind velocity falls below a predetermined level.

The cross sectional area of the first stage can be smaller than that of the third stage so as to provide reduced pressure in the first stage and increased pressure in the third stage.

It is another object of the present invention to provide apparatus for the production of fresh water from a stream of atmospheric air passed therethrough and processed in a first, second and third stage in the form of concentric cylinders standing substantially vertically to provide a chimney effect to move increased quantities of air, wherein the air in the first stage can be heated by solar energy and the air stream can be cooled in the third stage to squeeze the water vapor out of the air without the use or operation of a fan between the first and third stages and without the use of auxiliary heater means when the solar temperature is above a predetermined level and the wind velocity is above a predetermined level, so that the only energy required is for running the cooling water and condensate pumps for removing condensate extracted from the air stream.

It is another object of the present invention to provide an apparatus for the production of fresh water having a first, second and third stage included therein, and a structure which permits the apparatus to float in the water or to be utilized on land.

It is another object of the present invention to provide an apparatus for the production of fresh water comprising a first stage consisting of an air inlet duct and means for utilizing solar energy to heat the air passing through the first stage, and a second stage including a reservoir and wick means therein for containing water to charge the air stream with the maximum amount of water vapor it is capable of absorbing. The pressure can be reduced in the first stage by the Venturi method and/or use of a pressure fan placed between the second stage and a third stage with a restricted outlet. The temperature of the air is reduced in the third stage and the pressure increased in the third stage in order to squeeze out in the third stage by cooling and pressure the water vapor contained in the flowing stream of air.

It is another object of the present invention to provide an apparatus of compact arrangement and which is made out of light gauge sheet metal with a structure that enables it to be placed on land at one time to be utilized to produce fresh water, and to be floated in sea water at another time with the first and second stages disposed above the sea level, and the third stage disposed below the sea level to provide a temperature differential between the first stage and the third stage.

It is another object of the present invention to provide an apparatus for the production of fresh water consisting of three stages having substantially a ring or loop configuration with the first and second stages consisting of a relatively wide rectangular horizontal air flow duct of shallow depth, which thereafter is curved or looped downwardly and reverses its direction providing another horizontally extending section, and which duct thereafter loops or curves upwardly and terminates in a short forwardly extending horizontal outlet portion. The second stage is provided with means for adding water vapor to the air stream and a pressure fan is provided at the downstream side of the second stage. The third stage is provided with cooling coil means so as to decrease the temperature of the saturated air flowing through the third stage in order to condense out and remove the saturated water vapor from the air stream, and which cooling coil means can be provided with a connection for supplying heated water to the second stage so that the humidity of the air flowing through the first stage can be decreased in order to increase the efficiency of the fresh water production.

It is another object of the present invention to provide a three stage fresh water production apparatus consisting of a looped duct with fan means disposed between the second stage and the third stage of the apparatus, and a cooling coil in the third stage through which unit water can be pumped to cool the saturated air and squeeze out of it the water vapor therein, and in which the condensate from the air stream is collected in the bottom of the third stage and can be pumped to a small storage tank disposed in the apparatus at a higher level. The apparatus is also provided with rudder means and flotation means thereon so that the air inlet to the first stage is always pointing into the wind, so that when the wind velocity is above approximately ten miles an hour, there is no need to run the fan means between the second and third stages and the only energy required in the apparatus is to run the small cooling water and condensate pumps.

It is another object of the present invention to provide a looped configuration for the production of fresh water from a stream of relatively humid air passed through the duct, with a first stage provided with baffle means for utilizing solar energy to increase the temperature of the air flowing through the first stage, and reservoir and wick plate means disposed in the second stage through which the stream of air passes so the air will absorb water and increase its water vapor content, and a third stage in communication with the first and second stages to receive the saturated and humid air stream therefrom with fan means disposed between the second and third stages with a restricted inlet to reduce the pressure in the first and second stages and increase the pressure in the third stage, and cooling means in the third stage so that the decrease in the temperature and increase in pressure of the air stream as it flows through the third stage permits the water vapor carried in the air stream to condense out into fresh water.

It is yet another object of the present invention to provide a fresh water apparatus consisting of three stages to produce fresh water by removing the wick plate means in the second stage and cooling the tubes or coil in the third stage, and disposing the first and second stages above the ground level to increase the incoming air stream temperature, and disposing the third stage below the ground or otherwise insulating it to provide some degree of cooling plus increasing the pressure in the third stage by the fan so that some pure water can be produced by the third stage alone.

Other features and advantages of the present invention will be readily apparent from the following detailed description when considered in connection with the accompanying drawings forming a part hereof and in which:

FIGURE 1 is a side view of the method of carrying out my invention and an apparatus embodying the invention;

FIGURE 2 is a front end view of the apparatus shown in FIGURE 1, looking at it from the left side;

FIGURE 3 is a side elevation view of the method of my invention, and another apparatus embodying the invention;

FIGURE 4 is a horizontal section of the apparatus taken along line 4—4 of FIGURE 3; and FIGURE 5 is a side view of still another apparatus for carrying out the present invention.

Referring to the drawings, the reference numeral 10 generally designates an apparatus or structure for the production of fresh water from a relatively humid stream of air which contains a large quantity of water vapor passed through the structure to a three-stage operation. The structure 10 is substantially rectangular in shape as best illustrated in FIGURE 2 and is provided with a frame made of vertical legs or members 11 spaced laterally and longitudinally of each other to which horizontal or transversely extending members 12 and 13 are secured by any suitable means such as brazing or bolts and the like to form a rigid structure. Although the drawings illustrate only two sets of vertical members 11 and two sets of transverse members 12 and 13, it is apparent that if desired more structural members can be provided.

The air flow duct generally designated 14 through which the air stream of atmospheric air flows consists of an upper elongated flat horizontally extending portion or section 15, a downwardly curved section 16, a lower straight horizontal section 17, and an upwardly curved section 18. The air duct 14 comprises a generally looped configuration with the portion 16 curved backwardly upon itself, and the discharge section or portion 18 curved backwardly or rearwardly bent with respect to the straight section 17. The discharge section 18 is disposed just below the portion 15 of the duct and extends inwardly thereof, so that the portion 15 overlaps the backwardly curved portion 18 as best shown in FIGURE 1. The inlet end 19 of the duct is slightly enlarged when compared with the section 15 of the duct which comprises a shallow box approximately three inches deep and six feet wide. The bottom of section 15 of the duct includes a reservoir 20 adapted to contain approximately one-half to one inch of sea water, or contaminated water, which saturates a plurality of spaced vertical wick plates or members 22 disposed adjacent the discharge end of the section 15. It should be noted that any overflow of water in reservoir 20 will spill over the end or lip 31 of inlet end 19 and duct 14. The wick plates 22 extend across the air passage formed by the section 15 and are generally of a braided cotton material so that water from the reservoir 20 will completely saturate them. They can be properly secured within the duct section 15 by any suitable means. The duct 15 is curved or bent upwardly as indicated at 23 adjacent the discharge end so that any of the water in the reservoir 20 will not overflow into the curved section 16 of the air duct.

The first stage of the apparatus is generally indicated at 24 and consists of the portion of the duct section 15 from the inlet end 19 to a point 15a disposed along section 15. The second stage of the apparatus extends from 15a and includes section 16 to a point approximately adjacent the fan 25 located at the discharge end of the duct section 16. The duct 14 progressively has its cross section reduced or narrowed from the wide shallow box configuration of section 15 with a cross section of approximately one and a half square feet to an intermediate cross section adjacent 16 of approximately one square foot until it finally is reduced or necked to its smallest cross section beyond the fan 25 in section 17 of the duct. Section 17 constitutes the third stage of the apparatus.

The first and second stages adjacent the section 15 and beyond point 15a of the duct are provided with a plurality of vertical transversely extending elongated baffle plates 30 properly secured thereto and painted black, as is the duct 15, so that a relatively large black surface area is exposed to the sun for heating the air. Heat can also be supplied to the first stage by conventional means with an oil or gas heater so as to increase the temperature of the stream of humid air flowing through the first stage of the device.

In stage one the temperature of the air stream through the apparatus is increased and the pressure may also be decreased. Both changes increase the saturation point of the air so that it can carry more water vapor. Actually the increase of temperature is far more beneficial. Increasing the temperature requires only a small amount of the energy which would be required to increase the saturation point to the same level by decreasing the pressure. It is not necessary to have both increase in temperature and decrease in pressure.

After stage one where the air is put in a condition where it can absorb more moisture, it then passes to stage two where it is exposed to a source of moisture which can be sea water or brackish water from wells or any other source of polluted water unfit for human consumption or industrial requirements. Exposing the air to an additional source of moisture is done by using wick plates 22 in which the moisture can rise by capillary action where it intercepts the air flow, or by the use of fog nozzles directed against the air flow in a closed chamber. In either case provision can be made that no drippage from the wick plates or condensation from the fog nozzles is carried into the third stage to contaminate the product water. This can be done by a drip pan in the second stage draining in the opposite direction of the air flow.

In the third stage the air can be cooled in several ways such as by circulating the contaminated water through cooling coils if the temperature of this water is 10° F. or more below the temperature of the air stream, or by circulating the product water through cooling coils if it is 10° F. or more below the temperature of the air stream, or by mechanical refrigeration by circulating condensed Freon gas through cooling coils just as in a room air conditioner, and discharging the absorber heat to the outside air.

The third stage is provided with a cooling coil having parallel passes 32 and 33 in communication with a condensate pump 34 for passing cooling water through section 17 of the third stage of the air duct to reduce the temperature of the air flowing therethrough in order to condense and squeeze out from the saturated air the water vapor therein to produce fresh water. The two passes 32 and 33 of the cooling coil discharge into a relatively large diameter tube 35 closed at both ends and in communication with a pipe connection 36 for supplying feed water to the reservoir 20 in section 15 of the first stage of the apparatus. The utilization of the cooling water from the two cooling coil passes increases the temperature of the feed water before it is supplied to the reservoir 20 and thus increases the efficiency of the device. The cooling water passed through the cooling coils 32 and 33 can be from a source such as a well, or sea water as illustrated in FIGURE 1.

In the embodiment illustrated in FIGURE 1, the device is provided with stabilizers 38 in the form of sealed ballast members or tubes, as best shown in FIGURE 2, properly connected to opposite sides of the structural members 11 so that the device will float in sea water. The level of the sea will be as indicated at 39 in FIGURE 1 with the sea level being disposed at approximately one-half the height of the device. When the device is floated in the sea, the lower half of the section 16 and 18 and the section 17 are completely submerged in the sea water, as illustrated, to properly cool the third stage of the operation and decrease the temperature of the air flowing therethrough. When this device is used on land, the bottom of members 11 may be disposed on the ground or, if desired, the lower portion of the device can be properly insulated and placed below ground level so that the apparatus is half underground and analogous to its disposition in sea water.

A condensate extraction trough or channel 40 extends below the cooling coils 32 and 33 and below the lower end of the duct 17 so that condensate from around the outside of the walls will fall to the bottom of the duct and into the trough or channel 40. A condensate pipe 41 communicates with the trough 40 and with the suction of a condensate pump 42 properly secured by any suitable means to the lower side of the duct section 15. The condensate pump 42 is provided with a discharge line 43 for passing the purified water into a storage tank 44 properly secured to the structural members 11. The tank 44 extends transversely of the structure between the sealed ballast members or tubes 38.

A vertical fixed fin or rudder 45 is properly secured by any suitable means to the upper surface of the duct portion 16 and anchor connection means 46 are properly secured to the bottom of the duct section 18 so that an anchor can be attached to the device. The rudder 45 permits the device to head into the wind in boat fashion so that the inlet 19 for receiving the incoming air is constantly facing into the wind. The outlet 46 at the discharge end of the duct section 18 is disposed in a direction facing opposite the direction of the inlet 19 and is therefore constantly facing away from the wind.

The differential in pressure between the first stage and the third stage is accomplished by making the cross-sectional area of the first stage larger than the cross-sectional area of the third stage so that the velocity of a given volume of air through the first stage will be lower than through the third stage, which will produce a higher pressure in the first stage than in the third stage. By reducing the air intake and exhaust openings the use of a fan located between the first and third stages will also reduce pressure in the first stage and increase it in the third stage.

In operation, for producing fresh water from a stream of air having a fairly high relative humidity, the air enters the inlet 19, when the device is floated in sea water, as shown in FIGURE 1, and passes or flows through the air duct section 15. The sea water flows into the reservoir 20 through the pipe line 36 from the cooling coils 32 and 33. The water in the reservoir 20 rises by capillary action up through the wick plates 22 and the air stream intercepts and passes through the braided cotton members to charge the air with the maximum amount of water it is capable of absorbing. The duct and baffle plates 30 which are painted black and exposed to solar radiation heat and increase the temperature of the air stream flowing through the first stage section 15 of the device. The provision of the fan 25 supported on spider means adjacent the inlet and of the third stage section 17 causes a pressure differential between the first stage 34 and the third stage with the first stage having a reduced pressure and the third stage having an increase in pressure.

In the first stage the temperature of the air stream is increased and the pressure is reduced. The saturation point of the air stream increases so that a given volume of air will absorb a greater quantity of water in the form of invisible vapor. Thereafter, the air stream has the amount of water vapor carried in it increased by passing it to the second stage wherein it is exposed to a source of moisture.

In the third stage the air stream has its pressure increased and its temperature reduced so that the dew point of the air stream is decreased and the water vapor carried in the air stream begins to condense or deposit out as a liquid with the water particles or droplets falling to the bottom of the duct section 17 and being caught in the condensate extraction channel 40 after which they are pumped by the condensate pump 42 through line 41 into the fresh water storage tank 44.

In warm climates with a fairly high relative humidity, it has been found the air contains a large quantity of water vapor which can be abstracted with far less energy than it takes to get the water out of the salt from sea water.

At 70° F. temperature and 70% relative humidity, one cubic mile of air contains 26 million gallons of water. Thus some pure water can be produced by the third stage alone, i.e., by condensing the water out of the air by pressure and cooling and using a fan when necessary to maintain the air flow. If a source of salt or brackish water is available, the efficiency can be greatly increased by adding to this pressure and cooling stage a first stage in which the incoming air is raised in temperature and a second stage in which the air stream is exposed to the salt or brackish water. This increases the amount of water vapor in the air which is squeezed out in the third stage by cooling and pressure.

When the wind is 10 miles an hour or more, there is no need to run the fan and the only energy required is to run the small cooling water and condensate pumps. When the wind velocity is below 10 miles and hour, the fan is automatically turned on to continue the same flow of air through the machine.

It has been found by calculations that with the sun shining, an air temperature of 80° F., 70% relative humidity, cooling water temperature at 75° F., and a wind velocity of 10 m.p.h., this pressure and cooling stage alone will produce 2.5 gallons of water per hour with an energy consumption of 0.3 kw.h. If the wind velocity falls below 10 m.p.h., the fan cuts in using an additional 0.03 kw.h. At two cents per kw.h., the energy, including the fan, would be $0.48 (forty-eight cents) per 1,000 gallons of water.

It would also be possible to produce water by this device in areas far removed from any source of salt or brackish water. In this case the wick plates and the cooling tubes would be removed. The first stage would be exposed above ground to heat the incoming air and the third stage would be set below ground or otherwise insulated to provide some degree of cooling, plus pressure by the fan.

FIGURES 3 and 4 illustrate a modification of the apparatus for carrying out the method of the present invention. This embodiment comprises a structure 50 having an outer cylindrical member 51 within which is disposed an inner cylindrical member or tube 52. The cylindrical member 51 is sealed or closed off at the top and bottom and is provided with an air inlet duct or conduit 53 in the lower end thereof through which a relatively humid stream of air is passed. The inner cylindrical member or tube 52 is open at the upper end and is provided with a curved or bent section 54 adjacent its lower end extending through the wall of the cylindrical member 51 so as to form a discharge or outlet opening 55 for the apparatus. The tube 52 is concentrically disposed within the cylindrical member 51 so that an annular passage 56 is provided around the tube 52. It is thus apparent that the cylindrical member 51 and the tube 52 form parallel cylinders standing vertically to provide a chimney effect to move increased quantities of air through the structure. A plurality of annular or thin ring baffle plates or fins 57 are properly secured by any suitable means to the outer surface of the cylindrical member 51 to absorb solar heat. A cylindrical casing or housing 58 made of transparent plastic material is properly secured by any suitable means over the fins 57 to reduce solar heat loss due to wind. The heating fins are painted black to absorb more heat. The fins 57 as can be clearly seen in FIG. 3 are stacked in a vertical arrangement around the cylindrical member 51.

The bottom 59 of the cylindrical member 51 is mounted by any suitable means on a bearing 60 which in turn is mounted on a fixed pedestal 61 so that the entire structure can freely rotate or swing around the base 61. A rudder 62 is properly secured to the upper end of the cylindrical member 51 and extends through the plastic casing so that the intake 53 is pointed into the wind and the exhaust or discharge outlet 55 which is disposed opposite the intake 53, is pointed away from the wind.

An annular trough or liquid reservoir 63 is secured to the outer surface of the inner cylindrical member 52 adjacent the upper portion thereof and in annular passage 58. Water is supplied to the reservoir 63 by inlet tubing or piping 64 extending through the cylindrical member 61 and the plastic casing. The tubing 64 is made of flexible material and is of such a length that it will not interfere with the rotation or swiveling of the structure. Wick plates 65 of braided cotton or other wicking material are disposed in the trough 63 and extend across the upper portion of the annular passage 56 so that the incoming stream of air flowing through the structure is exposed to a source of water to charge the air with the maximum amount of water it is capable of absorbing.

The first stage of the structure comprises the portion of annular passage or chamber 56 below and up to reservoir 63. The portion of chamber 56 adjacent and above 63 and passage 66 adjacent the upper portion of the tubular member 52, and extending down to the pressure fan 67 comprises the second stage of the structure. Fan 67 is secured by a spider member 68 within the tubular member 52.

The first stage is also provided with an auxiliary oil, gas or electric heater 70 disposed adjacent the intake 53 which can be operated by automatic means if desired when the solar temperature differential falls below a predetermined level.

The third stage of the structure comprises the portion of tubular member 52 disposed below the fan 67. The third stage is provided with a cooling coil 71 having inlet and outlet cooling pipe lines 72 and 73 respectively. The lines 72 and 73 are made of flexible material and are of sufficient length so as to permit the entire structure to rotate or swivel about the base 61 without causing any damage to the lines 72 and 73. A condensate reservoir or trough 75 is disposed in the bottom of the duct section 54 and is provided with a condensate discharge line 76 connected thereto by any suitable means, in communication with a storage tank, not shown.

The cooling water entering line 72 and flowing into the cooling coil 71 can be connected to a source of contaminated or brackish water or can be connected to the fresh water storage tank, not shown. The supply of water to the reservoir 63 through the line 64 can be from any moisture source such as sea water or other contaminated or brackish water.

In operation, a stream of relatively humid air containing a large quantity of water vapor passes through the inlet 53 into the first stage of the structure and thereafter flows upwardly through the annular passage 56, changes direction, and flows downwardly through the tubular member 52. The increase of temperature in the flowing through the first stage and through the annular passage 56 provides a natural updraft since warm air rises. As the body or stream of air passes through the second stage, wick plates 65, and is exposed to a source of water the air is charged with the maximum amount of water it is capable of absorbing.

The clear plastic cylinder prevents any solar heat loss due to wind while the fins 57, which are painted black, absorb a maximum amount of solar radiation to heat the air stream. So long as there is a sufficient wind and the sun is not completely obscured and a supply of brackish or otherwise polluted water is available, the structure when rotatable will produce potable water with the use of a very small pump to circulate the feed and cooling water.

The pressure fan 67 between the second and third stages can be actuated by a switch if desired to cut in the fan whenever the wind drops below a certain speed or it can be run continuously for a higher production. The oil or gas heater 70 disposed to the intake 53 can cut in whenever the temperature drops below a certain value or it can be used continuously if desired to supplement the solar heat. To provide a 24-hour production of water the water would operate during the hours of darkness or heavy clouds and the fan would operate when the wind velocity drops below approximately 8 to 10 miles an hour. If desired the structure can operate in regions far removed from any source of feed water by using standard refrigeration equipment to provide the differential in temperature between the first and third stages, and the use of a fan to produce the required volume of air flow. The efficiency would then depend entirely on the relative humidity of the air.

The air stream flows into the top 66 of the tubular member 52 and thereafter downwardly therein. The heating of the air in the first stage of the structure and the decrease of the temperature by the cooling coil 71 in the third stage will cause the air to rise and sink in the cylinders, respectively, thereby creating a normal draft in the structure irrespective of wind velocity.

Thus the structure of the invention embodied in FIGS. 3 and 4 provides a three stage device for carrying out the method of the present invention in the form of parallel cylinders which stand vertically to provide a natural chimney effect to promote the air circulation therethrough and the production of fresh water.

Accordingly, the present invention provides a method of producing fresh water from a contaminated source or sea water in a three stage operation in which the temperature of a relatively humid stream of air has its temperature raised in the first stage and, if desired, its pressure decreased in the first stage, and thereafter the air passes to the second stage wherein it absorbs moisture, after which the stream of air goes through a third stage and has its temperature lowered, and its pressure increased if desired in order to squeeze out or condense the water vapor in the stream of air to potable water.

In addition the present invention provides a method of utilizing the above described three stage operation wherein the fairly high relative humidity of a stream of air containing a large quantity of water vapor can be abstracted with far less energy than it takes to get the water out of the salt in sea water.

Finally, the present invention further provides a method of producing fresh or potable water in a three stage operation using predetermined differentials in temperature and pressure.

Referring to the modification of the invention shown in FIGURE 5, it embodies the same three stage principle for producing fresh water, as already described except it operates entirely on purchased energy to heat the air in the first stage and reduce the temperature in the third stage, plus a blower fan to maintain constant circulation. In this arrangement no use is made of solar heat or wind velocity. While this would cost more to operate, a larger production of pure water can be accomplished with a much smaller machine.

In this embodiment, a casing 80 is provided having a first stage with an air inlet 82 and an electric heater 84 thereto. The air outlet 86 from the first stage communicates with the second stage provided with a spray header 88 having a plurality of spray nozzles for spraying water droplets across the path of flow of the air stream. A drip conduit 89 is provided for draining excess water from the second stage. A pressure fan 90 is disposed in the chamber downstream of the second stage, and adjacent the inlet end of the third stage in the casing.

A cooling coil 91 is disposed in the third stage, having an inlet pipe 92 and outlet pipe 93 connected thereto. A pump 94 is disposed in pipe 92 for supplying coolant to the coil, while outlet pipe is connected to header 88 to supply the heated water to the spray nozzles in the second stage. If desired, the cooling coil can be a refrigeration unit, in which case the water in pipe 92 can go directly to the spray header. Pipe 99 is an alternate direct source of supply of sea water to the spray header 88. A valve 100 is disposed in line 93 to shut off flow through it.

The spray nozzles are of a special commercial type called fog nozzles which produce a very fine mist composed of pure water vapor and very fine droplets. Where fog nozzles are used instead of wick plates the fog should be directed back against the inflowing air stream so that the air can pick up the vapor and the droplets have time to fall to a pan at the base before the air reaches the third stage. Any contamination in the water does not pass to the vapor but it does to the droplets so that it is important that the droplets do not enter the third stage. Baffle plates 101 insure that the droplets do not enter the third stage.

A throttle valve 95 of the butterfly type is disposed adjacent the outlet from the third stage and can be controlled to give a predetermined pressure differential. Product water is removed through pipe line 96 in the third stage to a storage tank 97. Thus, with this embodiment the first stage can be utilized to heat air and reduce the pressure therein, while the third stage can be utilized to cool the air and increase the pressure of air vapor to abstract product water.

What is claimed is:

1. A flotation and rotatable apparatus for producing potable water comprising a frame, a ballast means carried by said frame, a looped air conveying duct secured to said frame having a substantially horizontal upper inlet section with an inlet end and a water reservoir therein, a plurality of wick members extending into said reservoir and disposed across the air flow path through said horizontal section, solar heating means secured by said horizontal section, said duct having a downwardly curved section connected at its inlet end to the outlet end of said horizontal section and communicating at its outlet end with a substantially horizontally extending lower duct section, forced draft fan means disposed in said duct adjacent said curved and lower sections to decrease the pressure in said upper inlet and curved sections and to increase the pressure in said lower section, cooling coil means disposed in said lower section to condense out of the air stream water vapor carried therein, an upwardly curved duct section communicating at its inlet end with the outlet end of said lower duct section and disposed opposite said downwardly curved section and having its discharge opening facing in a direction opposite to that of the inlet end of said inlet duct section and disposed vertically adjacent and below said inlet duct section, a fresh water storage tank, means for passing condensed water from said lower duct section to said tank, means for feeding cooling water from said cooling coil means to said water reservoir, and rudder means for causing the inlet end of said inlet duct section to point into the wind, said ballast means being of sufficient dimension and size to float said apparatus partially submersed in a body of water, and means for connecting an anchor to said apparatus.

2. A rotatable apparatus for producing potable water comprising first and second substantially vertical cylinders with the first cylinder being concentrically disposed within the second cylinder to provide an annular air flow passage therearound, said second cylinder being a closed container and having an air inlet in the bottom thereof, said first cylinder having a lower end section extending through said second cylinder to provide a discharge outlet, the upper end of said first cylinder being open and spaced below the upper end of said second cylinder to receive air therefrom, solar heating means disposed around the outer surface of said second cylinder to heat air flowing therethrough; forced draft fan means to cause air to flow through said first and second cylinders, an annular water reservoir in said annular passage, with means extending into said reservoir and across the path of flow of air in said annular passage to increase the amount of water vapor carried in air flowing to said first cylinder, cooling means disposed in said first cylinder below said fan means to cool air caused to flow therethrough to condense water vapor in the air passing therethrough, rotatable base support means for said first and second cylinders, rudder means secured to said second cylinder to cause said second cylinder air inlet to face into the wind, and means for supplying feed water to said water reservoir.

3. The apparatus of claim 2 wherein casing means composed of clear plastic enclose said solar heating means to prevent solar heat loss due to wind, and auxiliary heating means are provided adjacent said second cylinder air inlet.

4. An apparatus for producing potable water comprising a horizontal casing having an inlet and outlet forming three stages therein, heating means disposed adjacent said inlet to heat air caused to flow therethrough, water spray means in said casing downstream of said heating means for intercepting a stream of air passing therethrough to increase the water vapor content of said stream of air, fan means disposed in said casing downstream of said spray means, indirect cooling means disposed in said casing downstream of said fan means for cooling said air stream, throttle valve means disposed in said casing downstream of said cooling means to provide a predetermined pressure differential in said casing between the inlet and outlet of said casing, and means for supplying water to said cooling means and spray means, and means for discharging potable water from said casing.

5. The apparatus of claim 4 wherein said means for supplying water is connected to said spray means in series therewith.

6. An apparatus for producing potable water comprising a structure including a first chamber having an inlet and outlet for passing a stream of air therethrough, means for heating the air stream in said first chamber, a second chamber having an outlet and in communication with said first chamber outlet to receive the air stream therefrom, means for exposing said air stream to water vapor in said second chamber, a third chamber in communication with the outlet of said second chamber, means for flowing air through said chambers, means for cooling the air stream passing through the third chamber to condense out water vapor carried in said air stream, said first, second, and third chambers being formed by substantially vertical cylindrical members, with the innermost member disposed concentrically within an intermediate member and said latter member defining an annular passage around said innermost member to define said first chamber, base means upon which said structure is rotatably supported, and rudder means provided for said structure whereby said structure will always face into the wind.

7. An apparatus for producing potable water comprising a structure including a first chamber having an inlet and outlet for passing a stream of air therethrough, solar heating means and means for reducing the pressure of the air stream passing through said chamber to raise the dew point thereof, a second chamber in communication with said first chamber outlet, means for charging said air stream in said second chamber with the maximum amount of water vapor it will hold including wick members and a reservoir provided in said first chamber, a third chamber in communicating with said second chamber to receive the air stream therefrom, said means for reducing the pressure in said first chamber being operable to increase the pressure in said third chamber, and means for cooling the saturated air stream passing through said third chamber to condense water out of said air stream.

8. An apparatus for producing potable water comprising a structure including a first chamber having an inlet and outlet for passing a stream of air therethrough, solar heating means for raising the temperature and means for controlling the pressure of the air stream passing through said chamber to raise the dew point thereof, a second chamber in communication with said first chamber outlet, means in said second chamber including wick members for charging said air stream with the maximum amount of water vapor it will hold, a third chamber in communication with said second chamber to receive the air stream therefrom, said means for controlling the pressure in said first chamber being operable to increase the pressure in said third chamber, and means for cooling the saturated air stream passing through said third chamber to condense water out of said air stream, said means for controlling the pressure of the air stream including a fan and a throttle valve.

9. An apparatus as defined in claim 8 wherein said throttle valve is positioned adjacent the outlet of said third stage and said fan is positioned between said second and third stages.

10. An apparatus comprising an air duct having an inlet and an outlet through which air flows, heating means for raising the capacity of the flowing air to absorb additional water vapor, means for exposing the flowing air to water vapor, cooling means for lowering the capacity of the flowing air to retain water and thereby condense water on surfaces from which it may be removed for use, a base member upon which said air duct is rotatably supported, and a vane responsive to wind for rotating said air duct so that the inlet of said duct faces into the wind.

11. An apparatus as defined in claim 10 wherein a forced draft fan is disposed in said air duct.

12. A flotation apparatus comprising an air duct having an inlet and an outlet through which air flows, heating means for raising the capacity of the flowing air to absorb additional water vapor, means for exposing the flowing air to water vapor, cooling means for lowering the capacity of the flowing air to retain water and thereby condense water on surfaces from which it may be removed for use, floating means adapted to float on water and upon which said air duct is mounted, and a vane responsive to wind for moving said floating means on the water so that the inlet of said duct faces into the wind.

References Cited

UNITED STATES PATENTS

| | | | |
|---|---|---|---|
| 614,776 | 11/1898 | Stocker | 202—163 |
| 804,973 | 11/1905 | Poplawski | 122—366 |
| 983,424 | 2/1911 | Brosius | 203—10 X |
| 1,516,225 | 11/1924 | Webb | 203—90 X |
| 2,076,498 | 4/1937 | Farwell | 159—13 X |
| 2,332,294 | 10/1943 | Bohmfalk | 202—234 |
| 2,803,591 | 8/1957 | Coanda et al. | 202—234 |
| 3,165,452 | 1/1965 | Williams | 202—180 X |
| 3,248,306 | 4/1966 | Cummings | 202—234 X |

FOREIGN PATENTS 780,272  7/1957  Great Britain.

NORMAN YUDKOFF, *Primary Examiner.*

J. SOFER, *Assistant Examiner.*